May 14, 1940.                    C. E. SMITH                    2,200,643
                  SELF-ADJUSTING SAFETY BALL-SLEEVE JOINT
                        Filed Dec. 5, 1938
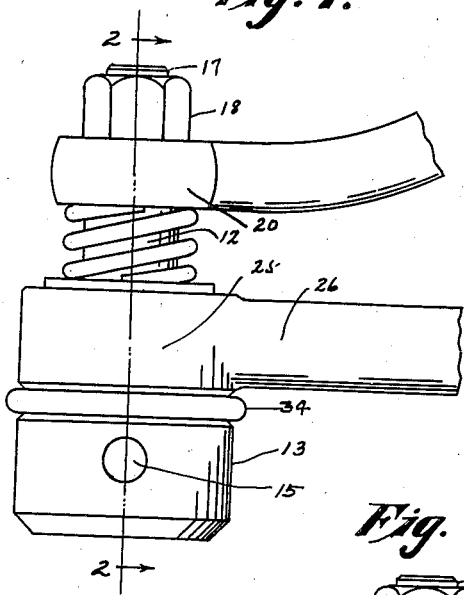
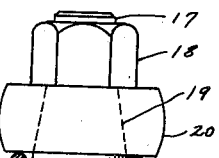
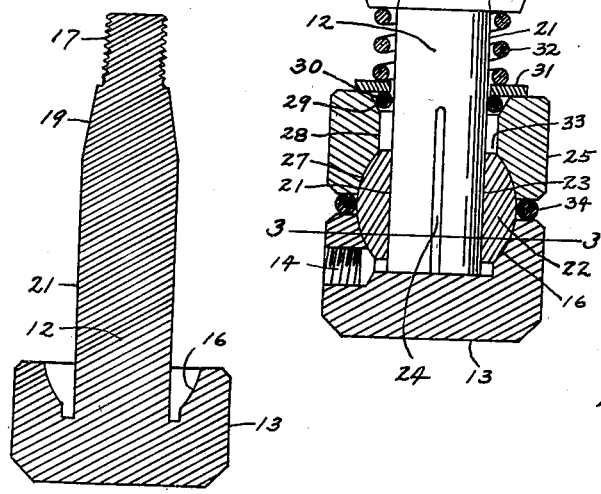
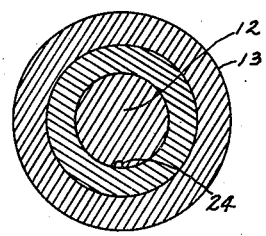
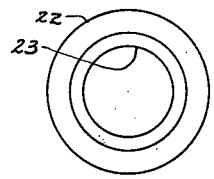
Inventor:
Charley Ernest Smith Patented May 14, 1940

2,200,643

UNITED STATES PATENT OFFICE

2,200,643

SELF-ADJUSTING SAFETY BALL-SLEEVE JOINT

Chesley Ernest Smith, Amherst, Nova Scotia, Canada

Application December 5, 1938, Serial No. 244,059

3 Claims. (Cl. 287—90)

The invention relates to improvements in joints for tie rod, drag link and knee action connections for automobiles in which a stud member with a large head carries a rotatable seating element and said element in turn carries a housing which is rotatable and tiltable on said seating element with exterior means to urge the respective parts of the joint into closer contact to compensate for wear and to prevent rattling and the objects of the improvements are: First, to provide a self-adjusting safety ball sleeve joint that is adapted to replace customary ball headed stud joints and self-adjusting ball and socket joints. Second, to provide a joint having a ball-sleeve rotatable on a stud member, said stud member having a large solid head, said head machined on the inside to form a segmental spherical seating surface for carrying said ball sleeve, a socket housing, rotatable and tiltable on said ball sleeve with all the respective bearing elements being urged by means of a sole exterior spring into closer cooperation at all times during use of the joint. Third, to provide a joint which does not require machining of a very intricate nature with the use of proper jigs and cutters. Fourth, to provide a self adjusting safety ball sleeve joint suitable for tie rods, drag links and knee action connections in which the ball sleeve by the constant vibration caused by the automobile in motion can rotate, revolve or turn all the way around on said stud member which will eliminate the possibility of flat places being worn on the spherical surface of said ball sleeve and, Fifth, to provide an absolutely safe tie rod joint in that the large solid forged mushroom head on said stud member carries the complete joint and being the same diameter as that of the said socket housing, the hardened metal in either the said socket housing, the said ball sleeve, or said stud head will have to practically all wear away before said joint can possibly fall apart.

One form of the invention is illustrated in the accompanying drawing, in which Figure 1 is an elevational view of the joint according to this invention showing a fragmentary portion of the link arm of the housing also a fragmentary portion of the steering arm; Figure 2 is a sectional view with parts in elevation, taken substantially along the line 2—2, Figure 1; Figure 3 is a cross-sectional view of the stud head and ball-sleeve taken substantially along the line 3—3, Figure 2; Figure 4 is a top view or end elevation showing the ball sleeve which is in one piece; Figure 5 is a longitudinal sectional view showing the stud member complete with the large mushroom head forged on one end, the other end being tapered and having a thread for a nut.

As shown on the drawing:

In Figures 1, 2 and 3 the reference numeral 12 indicates generally a stud with a large solid round head 13 forged on one end. A portion of said head is drilled, tapped and threaded to provide an opening 14 to receive a grease plug 15 to permit lubrication of the elements within the inside surface 16 of said head. This stud also comprises a threaded end 17 adapted to receive a nut 18, an intermediate tapered portion 19 adapted to receive the boss end 20 of a steering arm connection therearound, a cylindrical portion 21 below the tapered portion 19 extending to the solid head 13 part of which is to form a bearing for the inside surface 23 of the ball sleeve 22 to rotate on. The said cylinder portion 21 contains an oil groove 24 to permit lubrication being forced into the elements at the top end 33 of said ball sleeve. 25 indicates generally a socket housing which does not encase a spring and only extends part way down on said ball sleeve 22, said housing having an integral arm or link 26 extending laterally therefrom. The bore 27 of said socket housing 25 is defined by a segmental spherical wall 27, the small end of which defines a restricted opening 28 through which said stud 12 may freely extend, and said bore 27 in said housing 25 will be so arranged that when said housing is urged into position on said ball sleeve by the action of a sole compression helical spring 32 the arm 26 will be at right angles to said stud member 12.

Said compression spring 32 bears against the boss end 20 of steering arm and washer 31 which bears against and holds said housing 25 in place.

The top end of said opening 28 is countersunk at 29 to receive a rubber seal ring 30 which is held in position by said washer 31.

A rubber seal ring 34 is placed in position on the spherical surface of ball sleeve 22 between said socket housing 25 and said head 13 of stud 12.

One of the principal advantages of the construction above described is that there is only one exterior spring urging the parts together and keeping said socket housing in place against said ball sleeve. This spring being on the outside of the joint makes it much easier for replacement when necessary without having to take the joint apart. Another very important advantage of the construction above described is the large mushroom head on the stud member which will carry the socket housing and prevent it from dropping down after the segmental spherical bearing surfaces have worn away thus preventing very serious accidents.

I am aware that prior to my invention ball and socket joints with housings having segmental spherical bearing surfaces and studs rotatable in a ball on needle bearing surfaces have been used, and that springs inside of socket housings for keeping these parts together and compensating for wear, have been used for tie rods and drag link connections.

I therefore do not claim such combination broadly.

I claim:

1. A ball and socket joint comprising, a stud having a cylindrical bearing surface and an enlarged head, said head provided with an annular groove surrounding the cylindrical bearing surface, the outer wall of said groove forming a part spherical seat, a ball-sleeve rotatably mounted on the cylindrical surface of the stud and having a portion of its outer spherical surface seated in the part spherical seat in the stud head, a housing having a part spherical surface engaging a portion of the ball-sleeve and tiltable and rotatable in relation thereto and exterior means for holding all the respective bearing elements into close co-operation at all times during the use of the joint.

2. A ball and socket joint comprising, a stud having a cylindrical bearing surface and an enlarged head, said head provided with an annular groove surrounding the cylindrical bearing surface, the outer wall of said groove forming a part spherical seat, a ball-sleeve rotatably mounted on the cylindrical surface of the stud and having a portion of its outer spherical surface seated in the part spherical seat in the stud head, a housing having a part spherical surface engaging a portion of the ball-sleeve and tiltable and rotatable in relation thereto, and a spring surrounding the stud and engaging the housing and urging the latter against the ball-sleeve and the ball-sleeve against the seat.

3. A ball and socket joint comprising, a stud having a cylindrical bearing surface and an enlarged head, said head provided with an annular groove surrounding the cylindrical bearing surface, the outer wall of said groove forming a part spherical seat, a ball-sleeve rotatably mounted on the cylindrical surface of the stud and having a portion of its outer spherical surface seated in the part spherical seat in the stud head, a housing having a part spherical surface engaging a portion of the ball-sleeve and tiltable and rotatable in relation thereto, and a spring surrounding the stud and engaging the housing and urging the latter against the ball-sleeve and the ball-sleeve against the seat, said stud head being as large in diameter as the outside diameter of said socket housing.

CHESLEY ERNEST SMITH.